Jan. 8, 1946. W. F. ALLER 2,392,301
GAUGING DEVICE
Filed March 6, 1943 2 Sheets-Sheet 1

INVENTOR.
W. F. Aller
BY Edward J. Noe Jr
ATTORNEY.

Jan. 8, 1946.  W. F. ALLER  2,392,301
GAUGING DEVICE
Filed March 6, 1943  2 Sheets-Sheet 2
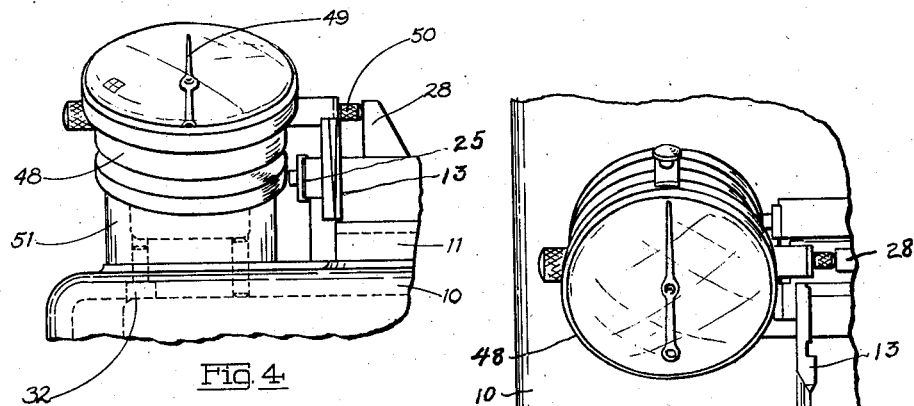
Fig. 4
Fig. 5
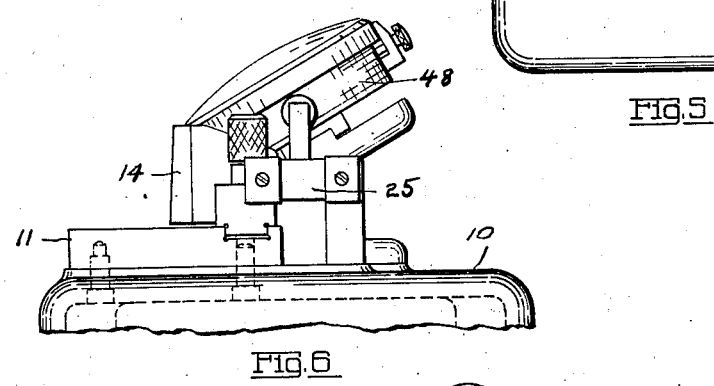
Fig. 6
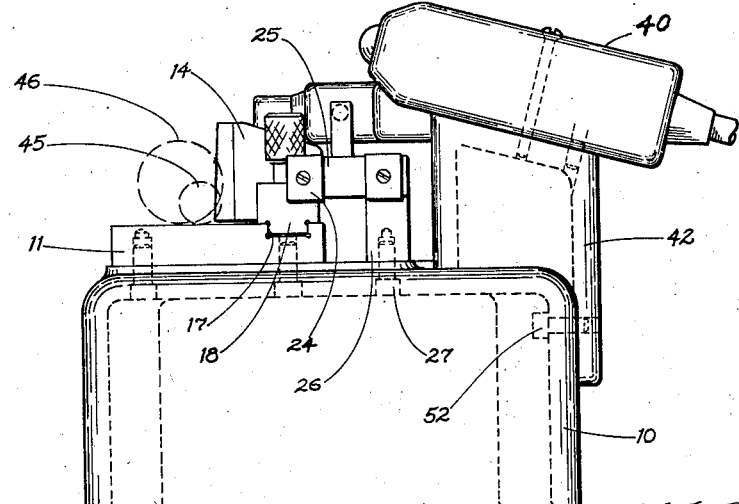
Fig. 3
INVENTOR.
W. F. Aller
BY Edward T. Noe
ATTORNEY.

Patented Jan. 8, 1946

2,392,301

UNITED STATES PATENT OFFICE 2,392,301

GAUGING DEVICE

Willis Fay Aller, Dayton, Ohio, assignor to The Sheffield Corporation, Dayton, Ohio, a corporation of Ohio Application March 6, 1943, Serial No. 478,208

3 Claims. (Cl. 33—199)

This invention relates to gauging devices and more particularly to gauging devices for measuring or comparing the pitch or lead of a screw threaded part.

One object of the invention is the provision of a thread pitch testing instrument having a pair of relatively movable thread engaging members, with a gauging device responsive to the movement of one of these members, the thread engaging members having portions of substantially V form elongated in a direction away from the surface on which the part to be gauged is applied so that threaded parts of different diameters can be accommodated.

Another object is the provision of a thread pitch testing instrument having a base provided with a flat work receiving surface and having a pair of relatively movable thread engaging blocks one of which cooperates with a gauging means which is arranged on a detachable supporting block independent of the main base, the construction being such that the gauging means and its supporting block may be readily removed from the base and be replaced by another gauging means and block of different form but held in proper position for co-action with the movable thread engaging member of the instrument.

Other objects and advantages of the invention will be apparent from the following description, the appended claims, and the accompanying drawings, in which Fig. 1 is a top plan view of a gauge embodying the present invention;

Fig. 3 is a side view of the gauge;

Fig. 4 is a front elevation of a portion of the gauge showing the mounting of a dial indicator form of gauging means;

Fig. 5 is a top plan view of a portion of the gauge shown in Fig. 4; and

Fig. 6 is an end view of the upper portion of the same gauge.

Figure 1:
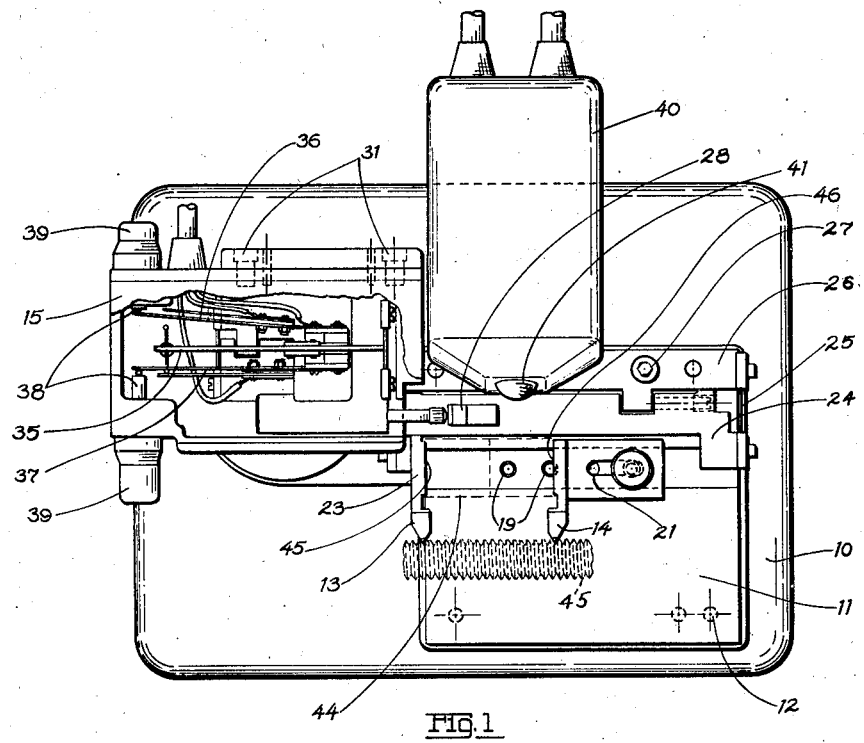
Figure 2:
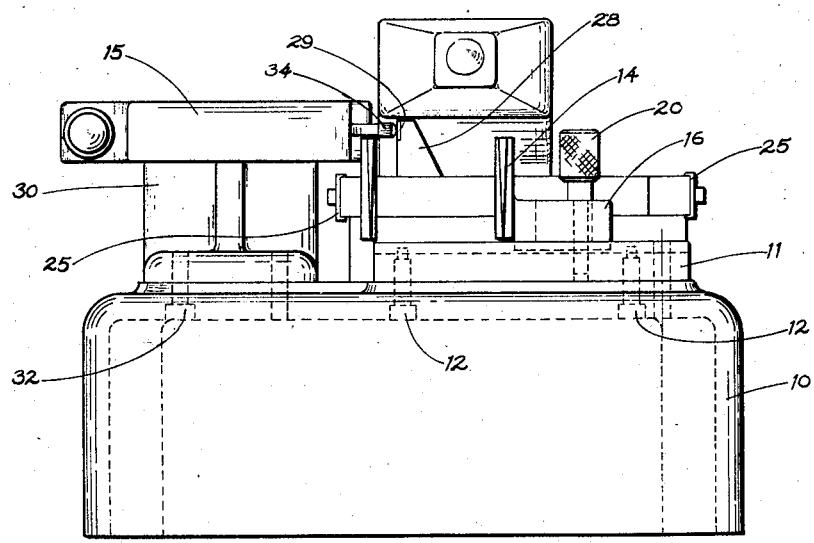
Fig. 2 is a front elevation of the gauge.

Referring more particularly to the drawings, in which like parts have been given the same reference numerals in the several views, and more particularly with reference to Figs. 1 to 3, 10 designates a support or base having a plate portion 11 which is preferably made as a separate member mounted in fixed position by means of suitable securing screws 12. The top of the plate portion 11 is preferably a flat horizontal surface on which the threaded parts to be gauged, such for example as a screw, may be placed and pressed against a pair of relatively movable thread engaging blocks 13 and 14. The relative horizontal movement of the blocks 13 and 14 produces a change in the position of a movable part of the gauging means 15 which is shown in the construction illustrated in these figures as a movable switch adapted to control electric circuits to produce a visible indication, as will be presently described.

The thread engaging block 14 has a horizontally extending leg 16 which rests on the portion 11 of the base, the latter having a groove 17 slidably receiving the tongue on the leg 16 and guiding the leg for horizontal movement towards and from the movable block 13. The plate portion 11 is provided with a series of spaced threaded holes 19 selectively engageable with a threaded locking stud 20 that extends down through a slot 21 in leg 16. By tighting the screw 20 in a selected hole 19, the stationary thread engaging block 14 is held in a desired spaced relation from the movable block.

The movable block 13 has a forwardly extending portion 23 fixed to or formed as a part of a rather long back piece 24. The latter is fixed to a pair of parallel spring blades 25 which, in turn, are fixed to a stationary upstanding member 26. Screws 27 hold the latter in fixed position on the base in back of the plate portion 11. The spring blades 25 control the movement of the block 13 so as to yieldingly permit horizontal movement towards and away from the block 14 while preventing any substantial travel of the block 13 towards the right or left as viewed in Fig. 3. The back piece 24 is provided with an upstanding arm 28 which is preferably provided with a hardened insert 29 having a flat surface facing towards the left as viewed in Fig. 2.

Arranged on the base 10 at one side of the plate portion 11 is a supporting block 30 which carries the gauging means 15. Suitable screws 31 form a detachable connection between the block 30 and the gauging means 15, and locating dowels and screws 32 detachably secure the supporting block in position on the base 10 so that the gauging means is in a definitely located position. The gauging means has a movable gauging element 34 adapted for horizontal movement under the control of the arm 28, the horizontal movement of the gauging element 34 causing movement of the switch arm 35 which makes and breaks a pair of electrical circuits by opening and closing a pair of switches 36 and 37. Adjustable stops 38 controlled by adjustment knobs 39 provide adjustments determining the amount of travel permitted the arm 35 before it opens or closes the switches, the construction illustrated being similar to that shown in Patent No. 2,254,313, granted Sept. 2, 1941. The electric circuits controlled by the switches 36 and 37 are suitably connected to two indicator lamps of different colors arranged in the lamp housing 40 and visible through the opaque or opalescent glass or lens 41 which shows the color of one or the other of the lamps depending on whether or not the arm 28 is positioned to one side or the other of a predetermined normal position. The lamp housing 40 is arranged on a suitable bracket 42 detachably carried by the base.

As will be now apparent, when a screw is placed on the work receiving surface of the base and pressed against the thread engaging blocks 13 and 14, the latter will be spread apart, or drawn closer together if the spacing of the thread engaging portions does not correspond to a multiple of the thread pitch of the screw. The block 14 is properly positioned by loosening the screw 20 and sliding the block until it is so spaced from block 13 that when a standard screw of known pitch is applied on the base and pressed against these blocks, there will be a very small lateral movement of block 13 towards the left as viewed in Fig. 1, causing a small movement of the gauging element 34. With the screw standard still held against the gauging blocks, the knobs 39 are manipulated until neither one of the two switches 36 and 37 are opened, and thus neither one of the two lamps in the lamp housing 40 will be energized. Any substantial movement of the block 13 from this position, however, will cause one or the other of the switches to be opened and energize one or the other of the two lamps in the lamp housing.

The standard screw is then removed, and the screws to be tested are applied one at a time to the work supporting surface of the base and pressed against the two gauging elements. If the pitch distance of the screw is too great, the movable block 13 will move farther to the left than it did when the standard screw was applied to it and the switch 36 will be opened, giving an apparent indication to the operator. If the pitch of the screw is smaller than it should be, the switch 37 will be opened.

Instead of obtaining the initial setting of the stationary block 14 by using a standard screw, the blocks 13 and 14 are constructed so that block 14 may be very conveniently positioned by using a "johnny-block" or blocks 44 applied between the parallel vertical surfaces 45 and 46 of the thread engaging blocks. These surfaces are recessed so as to lie in the same vertical planes that pass through the centers of the thread engaging portions and the size of the "johnny-blocks" will thus correspond to the spacing of the work engaging portions of the blocks 13 and 14.

It should be noted that the edge of the work supporting plate lies closely adjacent the movable work engaging block 13 to permit the thread of a bolt to be checked at a point close to the head, since the head end can be positioned to overhang the end of the plate portion 11. It should also be noted that the location of the block 13, and the block 14 also, is in between the vertical planes containing the spring blades which carry the movable block for yielding movement.

In accordance with the present invention, the work engaging blocks are so arranged as to accommodate threaded members of widely different diameters. The circles shown in dash lines in Fig. 3 represent a comparatively small workpiece 45 and a considerably larger workpiece 46, both resting on the upper surface of the plate 11 and both in effective engagement with the blocks 13 and 14. Obviously only one or the other of the two workpieces 45 and 46 may be applied to the work engaging blocks at the same time, but either one may be applied without changing these blocks other than making adjustment for changes in pitch of the screw threads. The effective work contacting portions of each of the two blocks 13 and 14 is of similar construction. The block 14 for example, at its effective portion, is of substantially V section and is considerably elongated in a direction away from the base surface on which the work rests. The outer portion of this block, that is, the portion presented towards the work, preferably extends substantially transversely of the work supporting surface, from a point rather closely adjacent the work supporting surface, and the lower portions are rather pointed while the upper portions of the block are truncated, the amount of truncation in the point of the V increasing as the block extends upwardly from the plate 11. When a threaded part of comparatively small diameter is applied to the blocks, they engage points on the blocks near the lower portions, where the truncation is less, since these smaller diameter threads will ordinarily have a finer pitch and a much shorter thread surface. Threads of larger diameter will engage the more truncated portions of the V section. Thus the engagement between the sides of the threads and the wedge shaped portions of the blocks will take place on the effective parts of the threads at or near the pitch diameter. The angle between the sides of the V of course corresponds to the angle between adjacent sides of the thread to be tested. When the thread to be tested is pressed against the blocks 13 and 14, the movable block 13 will move laterally to accommodate the thread, until the diverging sides of the two threads engaged by the two blocks will be in full contact with the converging sides of the blocks, thus definitely positioning the gauging element.

The readily detachable connection between the supporting block 30 and the base 10 permits the supporting block 30 and the gauging means 15 which it carries to be readily removed and replaced by another supporting block and a dial type indicator 48. As shown in Figs. 4, 5, and 6, the dial type indicator 48 is provided with an indicator needle 49 which is responsive to the movement of a gauging element 50. The element 50 is operated by the arm 28. The indicator type of gauging means is of different shape than the gauging means 15 and requires a different form of supporting block, which as shown at 51, is provided with the same hole spacing for engagement with the screws 32 to secure it on the base 10. The block 51 is of such size that the gauging element 50 is carried in the same position as the gauging element 34. The upper surface of the block 51 is inclined so that the dial faces upwardly and towards the operator at an angle for convenient visibility. When the dial type indicator is used, the bracket 42 is disconnected by removing the fastening screw 52.

While the forms of apparatus herein described constitute preferred embodiments of the invention, it is to be understood that the invention is not limited to these precise forms and that changes may be made therein without departing from the scope of the invention which is defined in the appended claims.

What is claimed is:

1. A gauging instrument for testing thread pitch comprising a base having a work receiving surface, a stationary thread engaging block fixed with respect to said base, a movable thread engaging block, means supporting said movable block for movement towards and from the stationary block, and gauging means operated by said movable block, said blocks each having a thread engaging and interfitting portion of substantially V section and elongated in a direction away from said base surface to engage threaded parts of different diameters when presented to said base, the adjacent portions of said blocks having parallel flat surfaces spaced apart a distance equal to the spacing between the centers of the thread engaging portions of the blocks.

2. A gauging instrument for testing thread pitch comprising a base having a flat work receiving surface which at one end thereof is spaced away from the adjacent parts of the base, a stationary thread engaging block adjustably fixed on said base, a movable thread engaging block arranged closely adjacent to said end of the work receiving surface, means supporting said movable block for movement towards and from the stationary block, spring means controlling the movement of said movable block, and gauging means operated by said movable block, said blocks each having a thread engaging portion of truncated V section and elongated in a direction substantially perpendicular to said base surface to engage threaded parts of different diameters when presented to said base, the degree of truncation increasing in accordance with the distance from the work receiving surface, the adjacent portions of said blocks having parallel flat surfaces spaced apart a distance equal to the space between the centers of the thread engaging portions of the blocks.

3. A gauging instrument for testing thread pitch comprising a base having a work receiving surface, a stationary thread engaging block fixed with respect to said base, a movable thread engaging block arranged closely adjacent one end of said work receiving surface, means supporting said movable block for movement towards and from the stationary block, and gauging means operated by said movable block, said blocks each having a thread fitting portion of truncated substantially V section elongated in a direction away from said work receiving surface with the degree of truncation increasing in accordance with the distance from the work receiving surface to engage and interfit threaded parts of different diameters at the pitch diameters thereof when presented to said surface.

WILLIS FAY ALLER.